(No Model.)
A. J. MALSBARY.
GRAIN DRILL ATTACHMENT FOR GANG PLOWS.
No. 553,926. Patented Feb. 4, 1896.
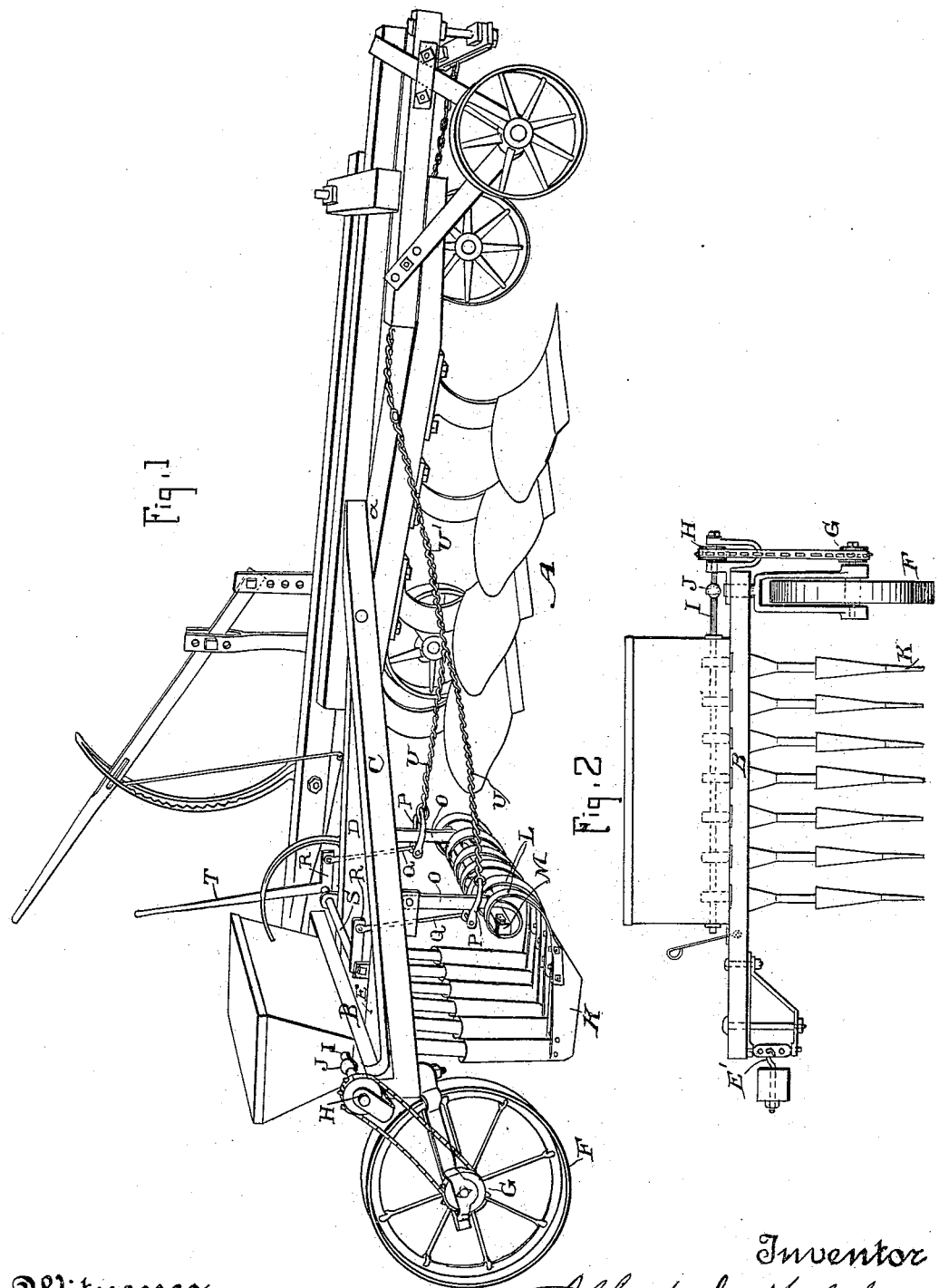
Witnesses,
Inventor,
Albert J. Malsbary
By Dewey & Co
Atty

UNITED STATES PATENT OFFICE.

ALBERT J. MALSBARY, OF REEDLEY, CALIFORNIA.

GRAIN-DRILL ATTACHMENT FOR GANG-PLOWS.

SPECIFICATION forming part of Letters Patent No. 553,926, dated February 4, 1896.

Application filed March 14, 1894. Serial No. 503,669. (No model.)

*To all whom it may concern:*

Be it known that I, ALBERT J. MALSBARY, a citizen of the United States, residing at Reedley, in the county of Fresno and State of California, have invented certain new and useful Improvements in Grain-Drill Attachments for Gang-Plows, of which the following is a full, clear, and exact description, such as will enable others skilled in the art to make and use the same.

My invention relates to improvements in seeder attachments for gang-plows.

It consists in certain details of construction, which will be more fully explained by reference to the accompanying drawings, in which—

Figure 1 is a perspective view of a gang-plow and its drill attachment embodying my invention. Fig. 2 is an end view of the same.

A is a gang-plow having a triangular frame with plows attached thereto, the style being locally known as the "Stockton gang-plow."

The drill-frame consists of a transverse rear timber, B, upon which the seed-box is supported, a laterally-inclined timber C, and braces D and E, all of which are rigidly bolted together in a triangular shape. The forward part of this frame is adapted to rest loosely upon the plow-beam at a.

The left end of the timber B of the drill-frame has a hook-and-eye connection E' by which it is supported from the left-hand timber of the plow-frame and may be adjusted forward or back, as shown, and the third point of support is the caster-wheel F. This caster-wheel has a vertical spindle extending up through a box, fixed at the junction of the timbers B and C of the drill-frame and properly braced. This caster-wheel has a broad tread to prevent its sinking in the soil and turns freely about its spindle, so as to allow the drill-frame to turn without straining the parts.

Upon the wheel-shaft or suitably fixed to turn with the wheel is a sprocket-wheel G, and upon the upper end of the spindle and turnable with it and the wheel is a sprocket-wheel H, and around these a suitable guiding-chain passes, so that the feed mechanism of the seeder (not here shown) is operated by means of a shaft I passing into the end of the box. This shaft is connected with the shaft of the upper sprocket-wheel by a ball-and-socket or universal joint J. This joint is in line directly above the spindle, so that the caster-wheel and both the sprocket-wheels may turn from side to side in unison without interfering with the proper working of the driving-chain, and at the same time the universal joint maintains a proper connection between the driving-shaft of the upper sprocket and that of the feed mechanism of the seed-box.

The seed passes down from the seed-box through tubes in the bottom, and these tubes deliver into the rear of V-shaped shoes or runners K, which are adapted to travel upon the ground in parallel lines and make channels or drills into which the grain falls in the usual manner of grain-drills. The rear ends of these runners are unsupported. The front ends are suitably attached to springs L, which are curved, as shown, and have their upper ends secured to a transverse bar M extending across beneath the drill-frame. This bar M is connected with the frame by hangers O, the upper ends of which are loosely hinged, so as to allow the bar to swing beneath the frame. Surrounding each of these vertical hangers are clevises P, which are movable up and down upon the hangers. These clevises are connected by rods Q with the rocker-arms R of a rotary shaft S, which is journaled in suitable boxes upon the seeder-frame.

T is a hand-lever, the lower end of which is fixed to the shaft and by which the shaft and the rocker-arms are turned so as to slide the clevises up or down upon the hangers as may be desired.

U U are chains connected with the front end of the clevises and converging so as to meet and unite with a single chain U', which leads forward and is attached to the plow-frame, as shown. Through this chain power is transmitted to draw the seeding apparatus, the hook-and-eye connection E' serving only to steady and support the drill-frame at that point.

Whenever the lever T is thrown up and backward the clevises will be caused to slide up on the vertical hangers, and this will allow the hangers to swing backward, thus relieving the runners or shoes from pressure and causing them to make more shallow channels or drills for the grain.

When it is desired to make these channels deeper, the lever T is thrown forward, and through the arms R and links Q the clevises are forced down toward the bottom of the hangers, and the draft thus being transferred to the lower end of these hangers they are pulled forward, so that the weight of the drill-frame is caused to act upon the shoes or runners, and thus force them more deeply into the ground. The intervening springs by their yielding allow the runners to adjust themselves to irregularities of the surface.

By the conjoint action of the springs and the movable hangers with the draft-chain a very accurate adjustment of the runners can be effected, which is particularly advantageous when in operation upon irregular surfaces, such as knolls or hog-wallows.

What I claim is—

1. In a grain-drill attachment for gang-plows, a triangular drill-frame having one timber extending forward, resting loosely upon the plow-frame, a caster-wheel by which the rear of the drill-frame is supported and turnable, an adjustable hook-and-eye connection between the other side of the drill-frame and the rear of the plow-frame, and a flexible chain connection between the drill-frame and the plow-frame whereby power is transmitted to draw the drill.

2. In a grain-drill attachment for gang-plows, a triangular drill-frame having the front end loosely supported upon the plow-frame, and the rear ends supported respectively by a hook-and-eye connection with one side of the plow-frame, and a swivel-wheel upon the other side having a vertical spindle turnable in a corresponding box, sprocket-wheels fixed respectively to the caster-wheel or its shaft, and to the head of the spindle whereby the driving-chain is always maintained in line with said wheels, and a shaft entering the seeder-box and united with the upper sprocket-wheel shaft by a universal joint in line with the vertical spindle.

3. In a grain-drill attachment for gang-plows, a drill-frame having its front end loosely supported upon the plow-beam, the rear ends respectively supported by a swiveling caster-wheel and a hook-and-eye connection with the rear of the plow-frame, runners or shoes adapted to form drills to receive the seed, a transverse bar extending above the front of said shoes, said springs connecting said bar with the front end of each shoe, suspending hangers connecting the transverse spring-bar with the drill-frame and chains connecting said hangers with the plow-frame, so that the drill is drawn over the ground thereby.

4. In a grain-drill attachment for gang-plows, a triangular drill-frame having the front end loosely supported upon the plow-beam, a swivel-wheel supporting one side of the rear of said frame, a loose connection between the other side of the rear end of the frame and the plow-frame, shoes or runners traveling upon the ground in front of the grain-drill tubes so as to form channels to receive the grain, a transverse bar extending beneath the drill-frame, curved springs connecting the front of each runner with the bar, vertical hangers having the lower ends attached to the bar, the upper ends loosely connected with the drill-frame, clevises slidably fitted upon the hangers, rocker-arms and lever with intermediate connections whereby said clevises are raised or lowered upon the hangers, and chains extending forwardly from the clevises having the front end attached to the plow-frame so as to impart motion to the grain-drill, and to regulate the depth of travel of the shoes or runners.

In witness whereof I hereunto set my hand.

ALBERT J. MALSBARY.

Witnesses:
J. W. HENDERSON,
FRED STOLL.